(12) United States Patent
Francini et al.

(10) Patent No.: US 8,453,670 B2
(45) Date of Patent: *Jun. 4, 2013

(54) POPPET VALVE WITH SLOPED PURGE HOLES AND METHOD FOR REDUCING A PRESSURE FORCE THEREIN

(75) Inventors: Stefano Francini, Florence (IT); Nicola Campo, Florence (IT); Michele Bianchini, Florence (IT)

(73) Assignee: Nuovo Pignone, S.p.A., Florence (IT)

( * ) Notice: Subject to any disclaimer, the term of this patent is extended or adjusted under 35 U.S.C. 154(b) by 922 days.

This patent is subject to a terminal disclaimer.

(21) Appl. No.: 12/183,133

(22) Filed: Jul. 31, 2008

(65) Prior Publication Data

US 2010/0025601 A1 Feb. 4, 2010

(51) Int. Cl.
*F16K 17/34* (2006.01)
(52) U.S. Cl.
USPC .................. 137/484.2; 137/512.1; 137/514.5
(58) Field of Classification Search
USPC ............ 137/484.2, 512.1, 543–543.23, 514.5
See application file for complete search history.

(56) References Cited

U.S. PATENT DOCUMENTS

| | | | |
|---|---|---|---|
| 2,918,083 A | 12/1959 | Clark, Jr. et al. | |
| 3,134,394 A * | 5/1964 | Ohta | 137/220 |
| 3,605,788 A | 9/1971 | Brown | |
| 5,065,790 A * | 11/1991 | Kornas | 137/514.5 |
| 8,136,547 B2 * | 3/2012 | Francini et al. | 137/514.5 |
| 2010/0024891 A1 * | 2/2010 | Francini et al. | 137/14 |

FOREIGN PATENT DOCUMENTS

| | | |
|---|---|---|
| DE | 19716471 A1 | 10/1998 |
| GB | 2021238 A | 11/1979 |
| GB | 2159248 A | 11/1985 |

OTHER PUBLICATIONS

European Search Report for EP 09 17 0612 dated Dec. 15, 2009.

* cited by examiner

*Primary Examiner* — Kevin Lee
*Assistant Examiner* — Macade Brown
(74) *Attorney, Agent, or Firm* — GE Global Patent Operation

(57) ABSTRACT

A poppet valve is disclosed that includes a valve body, a poppet guide disposed inside the valve body so as to form a flow passage from an inlet to an outlet of the valve, a poppet shutter disposed inside the poppet guide, and a biasing member to bias the poppet shutter away from the poppet guide toward an inside surface of the flow inlet so as to block the flow passage. The poppet valve further includes at least one discharge hole placing an inner chamber of the poppet guide in flow communication with a region of low static pressure of the flow passage. A method for reducing a closing pressure force acting on a poppet shutter of a poppet valve is also disclosed.

16 Claims, 2 Drawing Sheets

POPPET VALVE WITH SLOPED PURGE HOLES AND METHOD FOR REDUCING A PRESSURE FORCE THEREIN

BACKGROUND OF THE INVENTION

1. Field of the Invention

The embodiments disclosed relate generally to compressors and more particularly to poppet valves of hyper compressors with improved purge holes.

2. Description of the Related Art

Hyper compressors, those capable of producing gas pressure levels up to or above 3,000 bars, are widely used in industrial application, including, but not limited to, the production of low density polyethylene, or LDPE. The efficient performance of these compressors is controlled at least in part by suction and discharge automatic poppet valves. FIG. 1 illustrates a conventional poppet valve 10 in an opened position. As shown, the conventional poppet valve 10 includes a valve body 11 that contains therein a poppet, or poppet shutter, 12 configured to open and close the gas flow path in and out of a hyper compressor, a spring 14 configured to keep the poppet 12 in a closed position, and a poppet guide 16 that contains the poppet 12 and the spring 14. As shown, when the poppet shutter 12 is forced opened, a flow passage 17 (identified by several arrows in FIG. 1) is formed from an inlet 18 to an outlet 20 of the conventional poppet valve 10, the flow path being defined by the space formed between the poppet shutter 12 and the valve body 11 as well as between the poppet guide 16 and the valve body 11. The poppet guide 16 of the conventional poppet valve 10 further includes a discharge opening 22 along an axis 24 of the poppet guide 16 connecting an inside chamber 26 of the poppet guide 16 to the flow passage 17 in a region of flow stagnation, the back pressure in the poppet chamber 26 being defined at least in part by the static pressure in the region of the flow passage 17 around the axis 24 of conventional poppet valve 10.

These poppet valves play an important role in the reliability of hyper compressors used in plants for the production of LDPE. The performance of such valves depends not only on selected material properties and a suitable design to withstand high operating gas pressures, but also on a proper dynamic behavior of the poppet shutter 12. The proper opening and closing of the valve are influenced by various design constraints related to several dynamic forces acting on the valve, including a drag force acting on the poppet shutter 12 and poppet guide 16 to open the valve, this drag force being generated by the interaction of the gas flow with the noted valve parts; a gas pressure force acting on the poppet guide 16 to close the conventional valve 10, this gas pressure force being generated by the flow back pressure acting on a back surface of the poppet guide 16; an inertia force associated with the mass of the poppet shutter 12; and a spring force generated by the spring 14 to close the valve, among others.

One example of the above-noted design constraints includes the requirement of a complete and steady opening of the shutter during the suction stroke of a piston of the hyper compressor. In this case, a reduced flow area may cause increased pressure losses and higher gas temperatures, leading to losses in compressor efficiency. Furthermore, an unstable motion of the shutter may also lead to a reduction in maintenance time between failures due mainly to the increase in the number of impacts between mobile and stationary parts. Another example of a design constraint relates to the requirement of shutter closure by the return spring before the piston motion reverses in order to avoid backflow. In addition, the motion of the poppet during a premature closure may be further accelerated by the gas drag force acting in the same direction as that of the spring force. Yet another example relates to the requirement to maintain impact velocities between mobile and stationary parts within allowable limits in order to prevent or minimize impact surface wear and the need to unnecessarily increasing the impact strength of valve components, thus increasing valve weight and cost. Finally, another example of a design constraint is the requirement for low sensitivity to a sticking phenomenon caused by, among other factors, the presence of lubricating oil and other contaminants in the gas causing sticking in various surfaces in contact with one another, resulting in impact velocity increases and valve closure delays.

Different factors, such as high gas temperatures, early wear, the presence of polymers, or loud noise, may be an indication of poor valve performance that may result in a reduction in the lifetime of the valve. Three-dimensional computational fluid dynamics (or CFD) has been extensively used to accurately simulate pressure losses, drag forces, pressure distributions, and flow coefficient at various valve-operating conditions. Based on these simulation studies and experimental results it is known that poppet motion can be correlated to critical performance factors and can be used to estimate valve life and that, in conventional valve configurations, the above-noted drag and pressure forces are not sufficient to either stably or fully opening the valve.

It would therefore be desirable to develop an improved poppet valve for a hyper compressor that will be more efficiently opened and kept opened, thus increasing compressor performance and reducing maintenance and downtime.

BRIEF SUMMARY OF THE INVENTION

By accelerating the gas flow in the rear portion of a poppet valve, a reduced static pressure inside a purged internal chamber of the valve is achieved, thereby reducing a gas pressure force acting on a poppet shutter to cause the valve to close, reducing the required differential pressure along the valve to open it, and stabilizing the dynamic opening of the valve.

One or more of the above-summarized needs or others known in the art are addressed by poppet valves that include a valve body; a poppet guide disposed inside the valve body so as to form a flow passage from an inlet to an outlet of the valve; a poppet shutter disposed inside the poppet guide; and a biasing member to bias the poppet shutter away from the poppet guide toward an inside surface of the flow inlet so as to block the flow passage, the poppet guide further including at least one discharge hole placing an inner chamber of the poppet guide in flow communication with a region of low static pressure of the flow passage.

In another embodiment, poppet valves according to the subject matter disclosed includes a valve body; a poppet guide disposed inside the valve body so as to form a flow passage from an inlet to an outlet of the valve; a poppet shutter disposed inside the poppet guide; a spring disposed inside an inner chamber of the poppet guide; and a sloped purge flow passage placing the inner chamber of the poppet guide in flow communication with a region of low static pressure of the flow passage.

Methods for reducing a closing pressure force acting on a poppet shutter of a poppet valve are also with the scope of the subject matter disclosed herein. These methods include steps of accelerating the flow in a flow passage of the valve so as to reduce the static pressure in a region of the flow passage between an inlet and an outlet of the valve, a portion of this flow passage being formed between a poppet guide and a valve body; and placing an inner chamber of the poppet guide in now communication with the region of reduced static pressure of the flow passage so as to reduce a fluid pressure force acting against an inner surface of the poppet toward an inner surface of the valve body.

The above brief description sets forth features of the various embodiments of the present invention in order that the detailed description that follows may be better understood, and in order that the present contributions to the art may be better appreciated. There are, of course, other features of the invention that will be described hereinafter and which will be for the subject matter of the appended claims.

In this respect, before explaining several embodiments of the invention in detail, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

Further, the purpose of the foregoing Abstract is to enable a patent examiner and/or the public generally, and especially scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

BRIEF DESCRIPTION OF THE DRAWINGS

A more complete appreciation of the disclosed embodiments of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
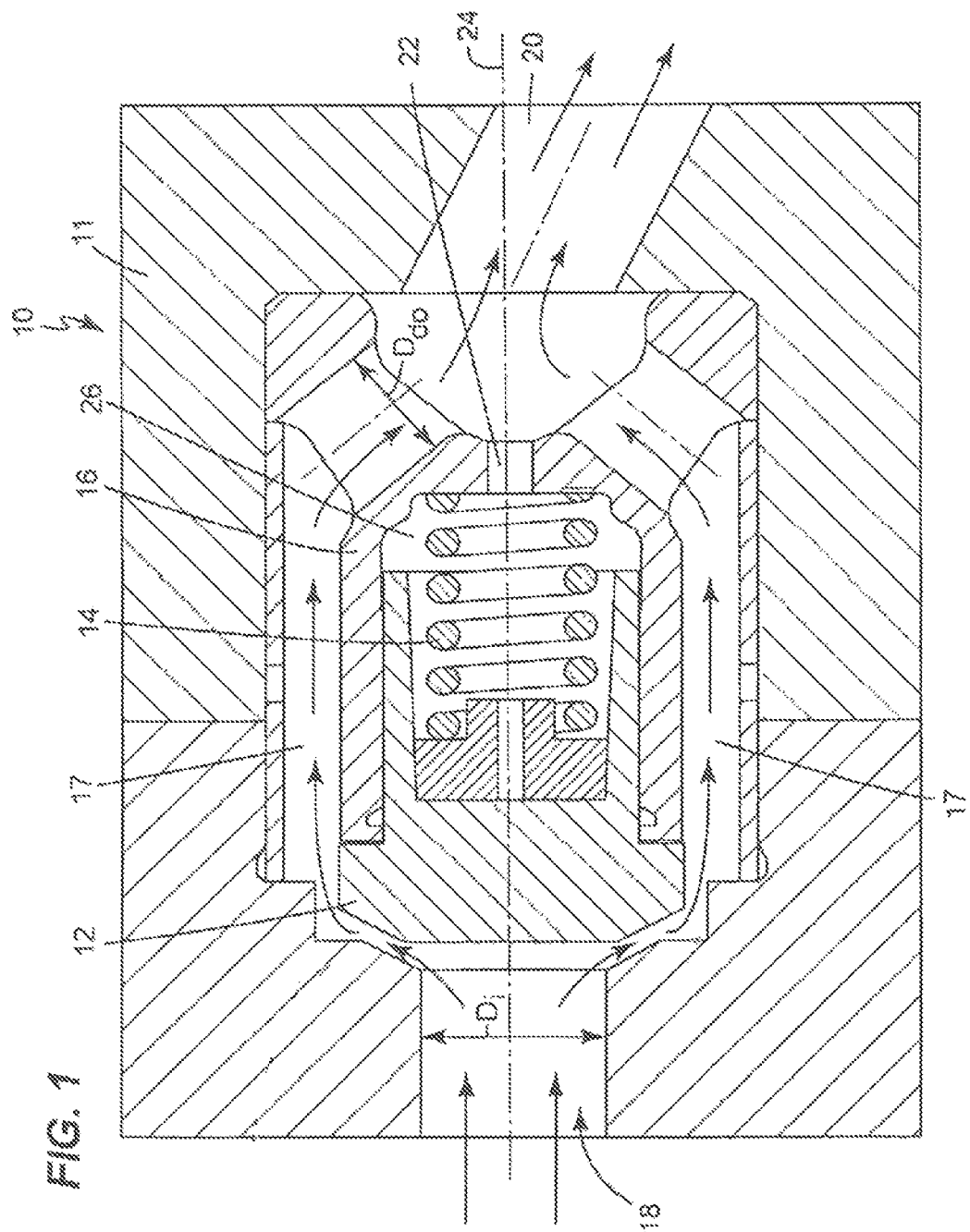
FIG. 1 illustrates a cutaway of a conventional poppet valve in an opened position.

Embodiments of the subject matter disclosed herein relate generally to compressors and more particularly to poppet valves of hyper compressors with improved purge holes. By accelerating the gas flow in the rear portion of the valve, a reduced static pressure inside a purged inner chamber of a poppet guide develops, thereby reducing a gas pressure force acting on the internal chamber to cause the valve to close, reducing the required differential pressure along the valve to open it, and stabilizing the dynamic process associated with the opening of the valve. Referring now to the drawings, wherein like reference numerals designate identical or corresponding parts throughout the several views, several embodiments of poppet valves disclosed herein will be described.

Figure 2:
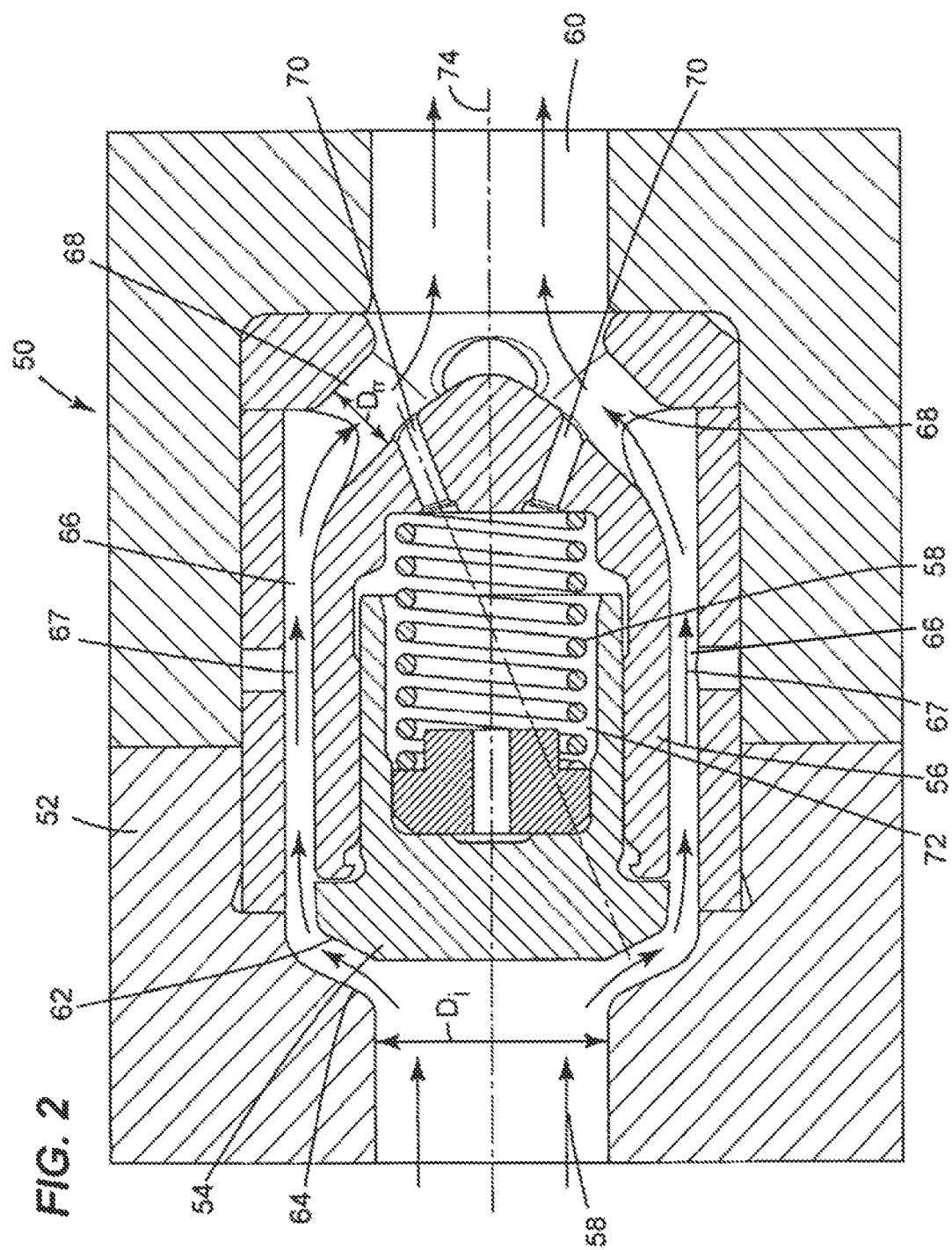
FIG. 2 illustrates a cutaway of a poppet valve in an opened position according to an exemplary embodiment of disclosed subject matter.

FIG. 2 illustrates a poppet valve 50 in accordance with an exemplary embodiment of the subject matter disclosed. As understood by those of ordinary skill in the applicable arts, the poppet valve 50 may either be a suction or discharge valve. As shown, the poppet valve 50 has been illustrated in an opened position. The poppet valve 50 includes a valve body 52, a shutter 54, a shutter guide 56, and a spring 58 biasing the valve body 52 away from the shutter guide 56 so as to seat the poppet shutter 54 against an inner surface of the valve body 52. The poppet valve 50 also includes an inlet 58 and an outlet 60. In operation, the spring 58 forces the shutter 54 so that a portion 62 of a surface of the shutter 54 rests against an internal surface 64 of the valve body 52, thereby preventing gas from flowing from the inlet 58 to the outlet 60 or vice versa. When the force exerted on the shutter 54 by the pressure of the gas in the inlet 58 is higher than the biasing force of the spring 58, the shutter 54 is moved to the opened position, thereby allowing gases to flow from the inlet 58 to the outlet 60 through flow passages 66 formed between the shutter 54 and the valve body 52 as well as between the shutter guide 56 and the valve body 52.

As also shown in FIG. 2, the shutter guide 56 includes two rear holes 68 that form a portion of the flow passages 66 as well as one or more discharge holes 70 placing an internal chamber 72 of the shutter guide 56 in flow communication with the flow passages 66. As further shown in FIG. 2, the discharge holes 70 are sloped with respect to a central line 74 of the poppet valve 50 such that a region of the flow passages 66 where the gas flow through the poppet valve 50 is accelerating is connected to the internal chamber 72 of the shutter guide 56. Since the flow accelerates through the accelerating-flow region, the static pressure inside the internal chamber 72 is reduced, thereby reducing the gas pressure force acting on the shutter 54 so as to bias it against the internal surface 64 of the valve body 52. In addition, as understood by those of ordinary skill in the art, the diameter of the rear holes 68 may be selected so as to control the amount of flow acceleration in the flow-accelerating region. In particular, the diameter of the rear holes 68, $D_{rr}$ of the poppet valve 50 is smaller than the corresponding holes in the conventional valve 10 shown in FIG. 1. For example, but not to be considered as a limitation, in one particular embodiment, $D_{rr}$ of the poppet valve 50 is 66% of the diameter of the discharge opening 22, $D_{do}$, of the conventional valve 10. Thus, assuming that the poppet valve 50 and the conventional valve 10 have similar inlet diameters, $D_i$, of 25 mm, $D_{do}/D_i$ for the conventional valve 10 is about 0.6 while $D_{rr}/D_i$ for the poppet valve 50 may vary from 0.36 to 0.44, preferably being 0.4. In addition, the inclination angle for the sloped discharge holes 70 are determined so as to assure that the internal chamber 72 is connected to the rear holes 68, taking into consideration the disposition of the spring 58 in the internal chamber 72. Therefore, for the exemplary embodiment just described, the range of values for the inclination angle should be between 10 and 25 degrees, preferably 19 degrees.

Thus some of the advantageous features of the poppet valve 50 of FIG. 2 include (1) rear holes 68 with a reduced diameter so as to cause the flow through the flow passages 66 to accelerate in the region where the discharge holes 70 connect the inside chamber 72 of the shutter guide 56 to the flow passages 66 and (2) one or more sloped discharge holes 70 connecting the rear holes 68 of the flow passages 66 to the inside chamber 72 of the shutter guide 56. With these advantageous features, the static pressure is "transmitted" from a location of low static pressure in the flow passages 66 (i.e., a location of flow acceleration) to the inside chamber 72 of the shutter guide 56. As a consequence the backpressure is reduced and the valve opening becomes more stable. As noted above, by accelerating the gas flow in the rear portion of the valve, a reduced static pressure inside the valve chamber develops, thereby reducing the gas pressure force acting on the internal poppet chamber to cause the valve to close, reducing the required differential pressure along the valve to open it, and stabilizing the dynamic process of opening the valve.

CFD simulation results considering fluid motion and valve dynamics have confirmed the operation of the poppet valve 50 as described above. The mathematical model for the valve dynamic is based on two differential equations, one related to the gas flow passing through the open valve for a certain pressure drop and the other related to the laws of motion of the shutter under the influence of an inertia force due to shutter mass, a damping force, an elastic force from the return spring, a drag force of the gas passing through the valve, and impact forces of the shutter against stationary parts at the end of shutter travel. Fluid flow has been predicted by solving the Reynolds-averaged, Navier-Stokes equations for steady flow using a two-equation eddy-viscosity turbulence model (K-ω) with wall integration boundary treatment.

One of the advantageous features of the disclosed subject matter that allows an increase of gas forces is the shifting of the purge hole. Such hole, configured to permit the entrance and exit of gas from the volume included between poppet and guide to change from an stagnation zone in a conventional valve design (hence pressure applied on the poppet backside is high) to a region where gas velocity reaches higher values, it is possible to lower the pressure causing a component of the gas force acting on the shutter to be higher than the spring reaction, thereby resulting in the above-described benefits and others that will be apparent to those of ordinary skill in the art upon consideration of the subject matter disclosed herein.

Methods for reducing a closing pressure force acting on a poppet shutter of a poppet valve are also within the scope of the subject matter disclosed herein. These poppet valves include a valve body, having a central axis, a flow inlet, and a flow outlet; a poppet guide; and a biasing member configured to bias the poppet shutter disposed inside the poppet guide against the valve body so as to close the poppet valve. These methods include the steps of accelerating the flow in a flow passage of the valve so as to reduce the static pressure in a region of the flow passage, the flow passage being disposed so as to place the flow inlet in flow communication with the flow outlet of the valve body, a portion of the flow passage being formed between the poppet guide and the valve body; and placing an inner chamber of the poppet guide in flow communication with the region of reduced static pressure of the flow passage so as to reduce a fluid pressure force acting against an inner surface of the poppet shutter toward an inner surface of the valve body.

In the disclosed methods, the flow passage passes through at least one hole in the poppet guide and the region of low static pressure is located in a portion of the flow passage where the at least one hole is located. In addition, the placing in flow communication may alternatively comprise placing the inner chamber of the poppet guide in flow communication with the portion of the flow passage via at least one discharged hole disposed in the poppet guide. As described hereinabove, the region of low static pressure is a region of flow acceleration and the at least one discharge hole is inclined with respect to a central axis of the valve body. An inclination angle of the at least one discharge hole may vary between 10 and 25 degrees. Thus, although a range of angles for the inclination of the at least one discharge hole is envisioned, an inclination angle of approximately 19 degrees is favored.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

What is claimed is:

1. A poppet valve, comprising:
   a valve body, said valve body having a central axis, a flow inlet, and a flow outlet;
   a poppet guide disposed inside the valve body so as to form a first portion of a flow passage from the flow inlet to the flow outlet, said first portion of said flow passage being formed between an inside surface of the valve body and an outside surface of the poppet guide;
   a poppet shutter disposed inside the poppet guide, the poppet shutter being configured to form a second portion of the flow passage between an outside surface of the poppet shutter and the inside surface of the valve body; and
   a biasing member disposed inside an inner chamber of the poppet guide, said biasing member being configured to bias the poppet shutter toward an inside surface of the flow inlet so as to block the passage,
   wherein said poppet guide further includes at least one discharge hole placing the inner chamber of the poppet guide in flow communication with a region of low static pressure of the flow passage, at the at least one rear hole, the at least one discharge hole being inclined with respect to the central axis of the valve body.

2. The poppet valve according to claim 1, wherein the region of low static pressure is a region of flow acceleration.

3. The poppet valve according to claim 2, wherein the amount of flow acceleration is controlled by a diameter of the at least one rear hole in the poppet guide.

4. The poppet valve according to claim 1, wherein an inclination angle of the at least one discharge hole varies between 10 and 25 degrees.

5. The poppet valve according to claim 4, wherein the inclination angle is approximately 19 degrees.

6. The poppet valve according to claim 1, wherein the at least one discharge hole is disposed in the poppet guide so as to reduce a pressure force acting against an inner surface of the poppet shutter toward the valve inlet.

7. The poppet valve according to claim 1, wherein said biasing member is a spring.

8. A hyper compressor comprising a poppet valve including:
   a valve body, said valve body having a central axis, a flow inlet, and a flow outlet;
   a poppet guide disposed inside the valve body so as to form a first portion of a flow passage from the flow inlet to the flow outlet, said first portion of said flow passage being formed between an inside surface of the valve body and an outside surface of the poppet guide and passing through at least one rear hole in the poppet guide;

a poppet shutter disposed inside the poppet guide, the poppet shutter being configured to form a second portion of the flow passage between an outside surface of the poppet shutter and the inside surface of the valve body; and a biasing member disposed inside an inner chamber of the poppet guide, said biasing member being configured to bias the poppet shutter toward an inside surface of the flow inlet so as to block the flow passage, wherein said poppet guide further includes at least one discharge hole placing the inner chamber of the poppet guide in flow communication with a region of low static pressure of the flow passage at the at least one rear hole, the at least one discharge hole being inclined with respect to the central axis of the valve body.

9. A method for reducing a closing pressure force acting on a poppet shutter of a poppet valve, said poppet valve having a valve body with a central axis, a flow inlet, and a flow outlet, said poppet valve including further a poppet guide and a biasing member configured to bias the poppet shutter disposed inside the poppet guide against the valve body so as to close the poppet valve, the method comprising:

accelerating a flow in a flow passage of the valve so as to reduce the static pressure in a region of the flow passage, said flow passage being disposed so as to place said flow inlet in flow communication with said flow outlet, a portion of said flow passage being formed between the poppet guide and the valve body and passing through at least one rear hole of the poppet guide; and placing an inner chamber of the poppet guide in flow communication with the region of reduced static pressure of the flow passage via at least one discharge hole that is inclined with respect to a central axis of the valve body and being located in the region where the flow is accelerated, at said at least one rear hole to reduce a fluid pressure force acting on an inner surface of the poppet shutter toward an inner surface of the valve body to cause the poppet valve to close.

10. The method according to claim 9, wherein said accelerating the flow further comprises accelerating the flow through said at least one rear hole in the poppet guide.

11. The method according to claim 9, wherein an inclination angle of the at least one discharge hole varies between 10 and 25 degrees.

12. The method according to claim 11, wherein the inclination angle is approximately 19 degrees.

13. A poppet valve, comprising:

a valve body, said valve body having a central axis, a flow inlet, and a flow outlet;

a poppet guide disposed inside the valve body so as to form a first portion of a flow passage from the flow inlet to the flow outlet, said first portion of said flow passage being formed between an inside surface of the valve body and an outside surface of the poppet guide and passing through at least one rear hole in the poppet guide;

a poppet shutter disposed inside the poppet guide, the poppet shutter being configured to form a second portion of the flow passage between an outside surface of the poppet shutter and the inside surface of the valve body;

a spring disposed inside an inner chamber of the poppet guide, said spring being configured to bias the poppet shutter toward an inside surface of the flow inlet so as to block the flow passage; and a purge flow passage placing the inner chamber of the poppet guide in flow communication with a region of low static pressure of the first portion of the flow passage at the location of the at least one rear hole, said purge flow passage being sloped with respect to the central axis of the valve body.

14. The poppet valve according the claim 13, wherein a ratio of a diameter of the at least one rear hole to a diameter of the flow inlet ranges from about 0.36 to about 0.44.

15. The poppet valve according to claim 13, wherein an inclination angle of the at least one discharge hole varies from approximately 10 to approximately 25 degrees.

16. A hyper compressor comprising a poppet valve according to claim 13.

* * * * *